(12) United States Patent
Johnson et al.

(10) Patent No.: US 7,934,726 B1
(45) Date of Patent: May 3, 2011

(54) SHOPPING CART DISPLAY SYSTEM

(76) Inventors: Michael A. Johnson, Scottsdale, AZ (US); Aria Pakravan, Scottsdale, AZ (US)

( * ) Notice: Subject to any disclaimer, the term of this patent is extended or adjusted under 35 U.S.C. 154(b) by 1034 days.

(21) Appl. No.: 11/799,555

(22) Filed: May 3, 2007

(51) Int. Cl.
*B62D 39/00* (2006.01)
*G06F 3/00* (2006.01)
*G06Q 30/00* (2006.01)

(52) U.S. Cl. .................. 280/33.992; 40/308; 705/14.51; 705/14.62

(58) Field of Classification Search ............. 280/33.992; 40/308; 705/14.51, 14.62
See application file for complete search history.

(56) References Cited

U.S. PATENT DOCUMENTS

| | | |
|---|---|---|
| 4,021,953 A | 5/1977 | Couch |
| 4,292,749 A | 10/1981 | Thomas |
| 4,513,983 A | 4/1985 | Calder |
| 5,072,956 A * | 12/1991 | Tannehill et al. ........ 280/33.992 |
| 5,301,443 A | 4/1994 | Gori |
| 5,810,372 A | 9/1998 | Arendt |
| 6,698,121 B2 * | 3/2004 | Wardle et al. .................. 40/452 |

* cited by examiner

*Primary Examiner* — Donald L Champagne
(74) *Attorney, Agent, or Firm* — Harpman & Harpman

(57) ABSTRACT

An integrated shopping cart display and information handle attachment having multiple display orientation surfaces that are selectively positioned for viewing and use access by index rotation. Information display surfaces combining interior light source with position activation and display criteria, multiple features are available including product coupon access and bar code product scanning as well as sanitation and lotion dispensing access. Display panel illumination with internal self-contained renewal power source through solar cells and multiple safety reflective tape surfaces positioned on said display attachment. Information sheet overlying the display viewing area so as to provide for a useful point of sale information display and coupon redemption system.

11 Claims, 5 Drawing Sheets

SHOPPING CART DISPLAY SYSTEM

BACKGROUND OF THE INVENTION

1. Technical Field

This invention relates to shopping carts and associated information displays for imparting point of purchase information venues.

2. Description of Prior Art

Prior art devices of this type have been directed to a variety of different grocery cart attachments, see for example U.S. Pat. Nos. 4,021,953, 4,292,749, 4,513,983, 5,301,443, and 5,810,372.

In U.S. Pat. No. 4,021,953 a shopping cart display guide attachment is disclosed which is secured to the handle indicia insertion therefore.

U.S. Pat. No. 4,292,749 illustrates a simple clip-on coupon display clipboard holder device for shopping carts.

U.S. Pat. No. 4,513,983 claims a point of purchase advertising cylinder that is secured between the cart's handle support arms having multiple display surfaces therewithin.

U.S. Pat. No. 5,301,443 discloses a shopping cart handle display which provides for multiple fixed advertising areas.

U.S. Pat. No. 5,810,732 is directed towards an improved shopping cart push handle having a hollow visual interior surface into which structured ad inserts can be positioned.

SUMMARY OF THE INVENTION

An interactive self-contained shopping cart handle attachment by which illuminated sequential display areas are selectively presented to the shopper having store coupons and ancillary product information with indicia for coupon scanning as well as comfort and sanitation dispensing features coupled with a self-powered and attention getting illuminated display areas to attract and engage the shopper during the shopping experience.

DETAILED DESCRIPTION OF THE INVENTION

Figure 1:
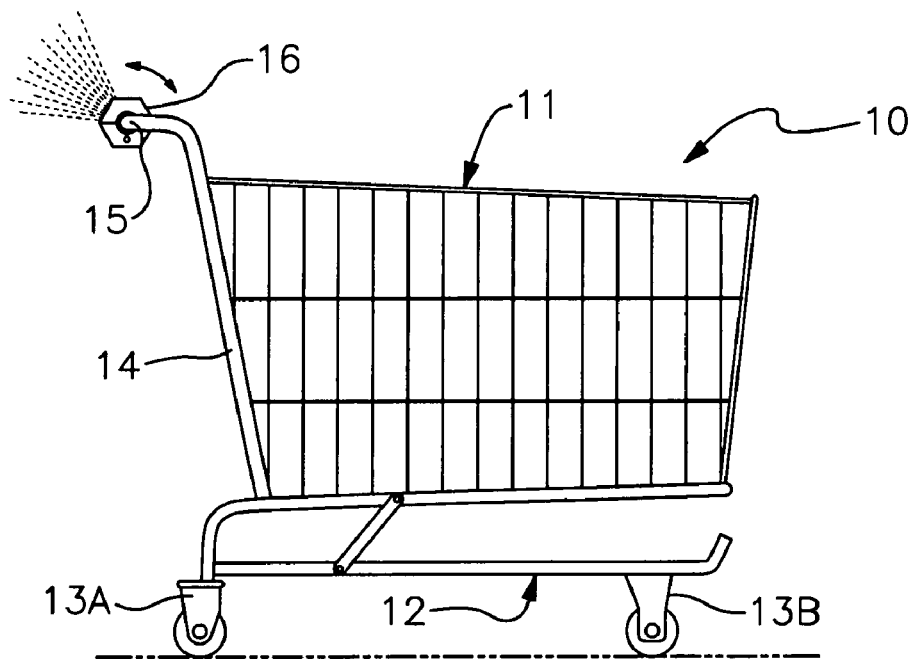
FIG. 1 is a side elevational view of a handle display equipped shopping cart.
Figure 2:
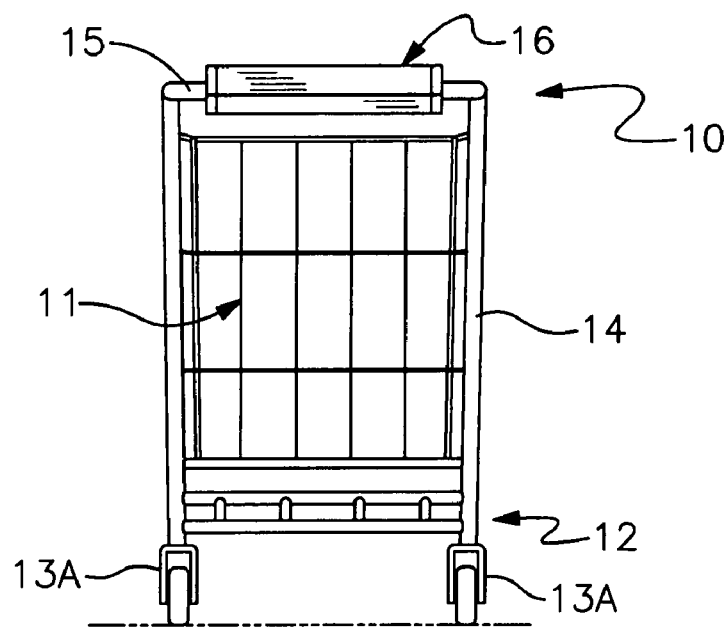
FIG. 2 is an end elevational view thereof.

Referring to FIGS. 1 and 2 of the drawings, a shopping cart 10 can be seen having a basket portion 11 and a basket support frame 12. The basket support frame 12 has multiple wheeled pairs 13A and 13B with basket support elements 14 that extend therefrom to form additionally horizontal disposed handle 15 as will be well understood by those skilled within the art.

Figure 3:
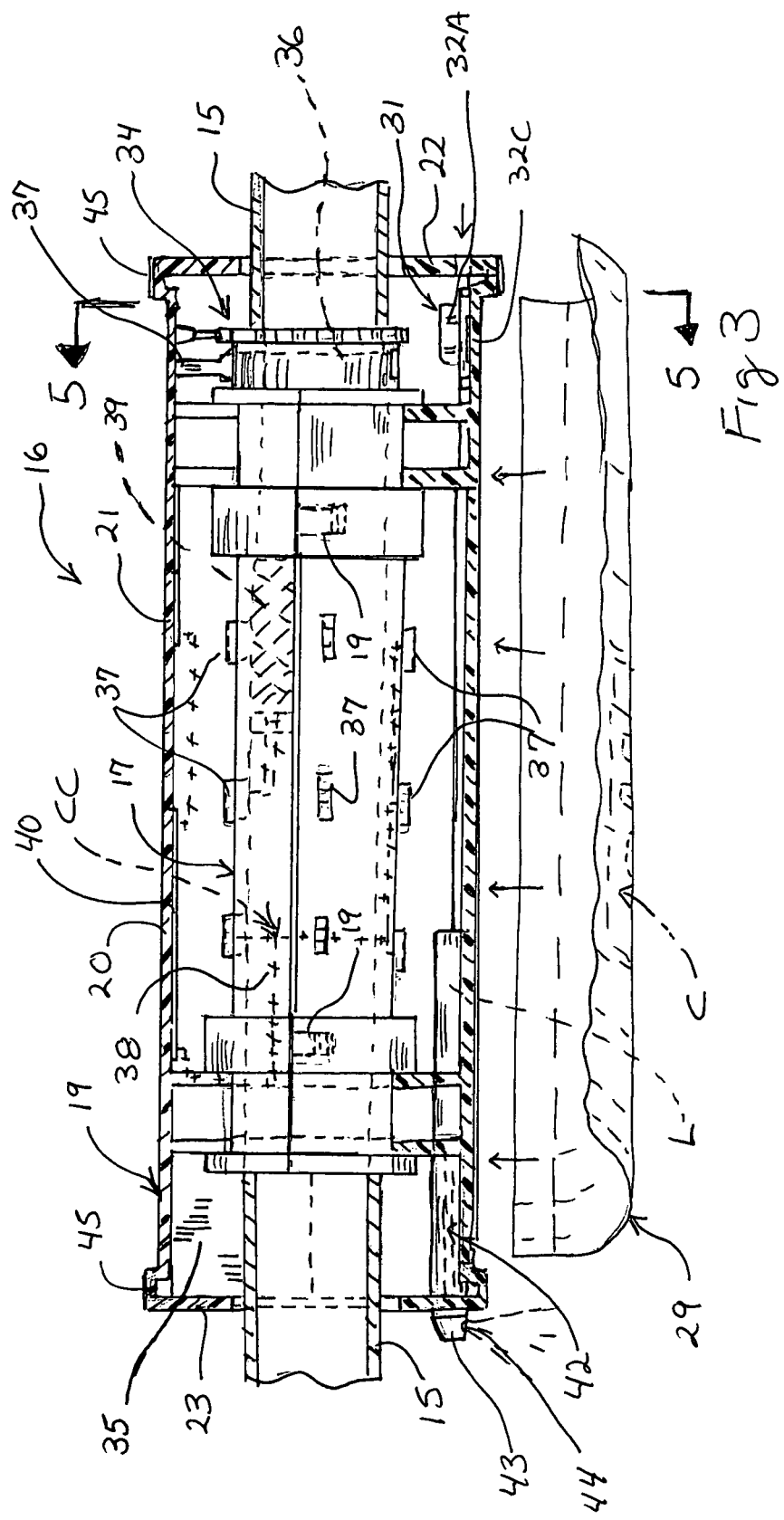
FIG. 3 is an enlarged partial side sectional elevational view of the dispensing device of the invention with portions broken away.
Figure 9:
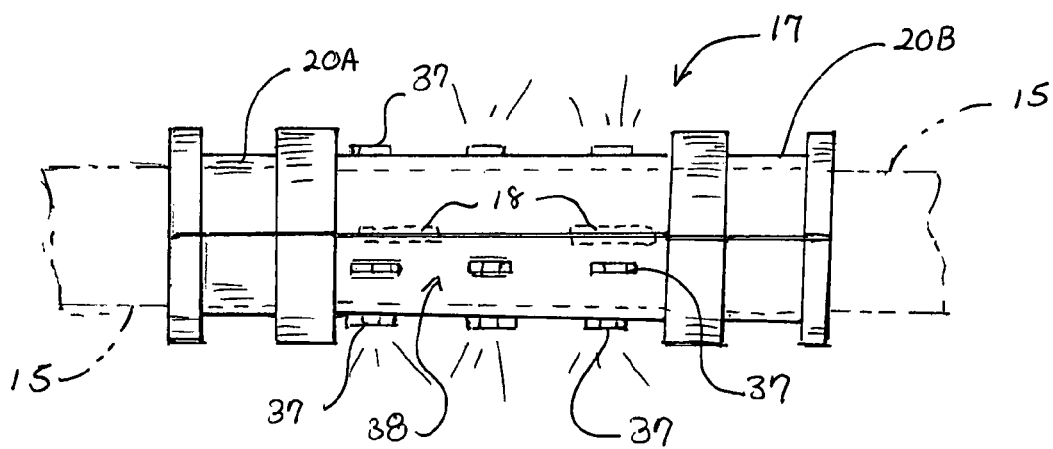
FIG. 9 is a side elevational view of the cart handle engagement element.

An interactive information display attachment 16 of the invention is rotatably secured to the handle 15 of the cart by an interlocking attachment and support hub 17, best seen in FIGS. 3 and 9 of the drawings. The attachment element 17 has a two half body member configuration interconnected by live hinges 18 and secured together by interlocking tabs 19, shown in dotted lines in FIG. 3 of the drawings. The attachment element 17 has a pair of oppositely disposed bearing surface fittings 20A and 20B which are formed when secured about the cart handle portion 15.

The interactive information display attachment 16 defines a main body portion 19 that is rotatable on the attachment element hub 17 as hereinbefore described. The main body 19 is defined by a two-part elongated multi-sided transparent housing 20 having, in this example, multiple equal side display surfaces 21 thereabout and respective end closure caps 22 and 23 formed thereby.

The housing 20 is formed by two shell portions 24 and 25, each defining one-half of the complete housing 20 when engaged together. Each of the shell housings 24 and 25 have two pairs of ride bearing rails 26 formed within with a half-arcuate bearing engagement surface 24A and 24B, 25A and 25B, best seen in FIGS. 6, 8 and 9 of the drawings adjacent each end thereof.

Figure 7:
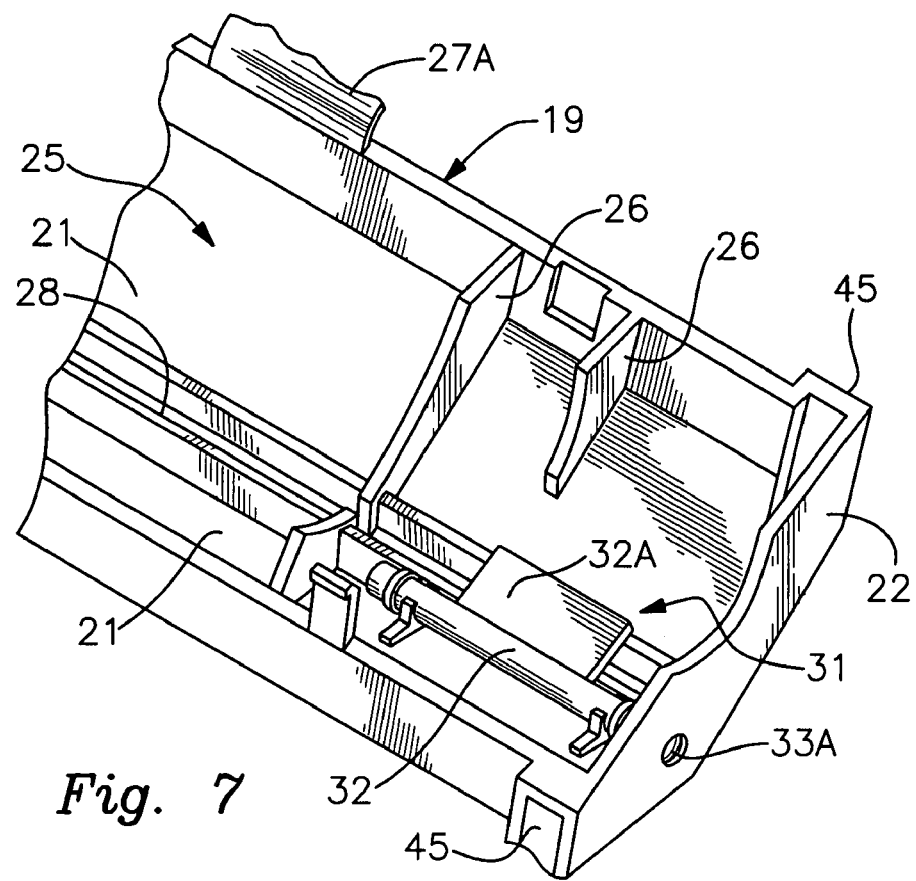
FIG. 7 is a partial perspective view illustrating information attachment sheet insert and release mechanism.
Figure 8:
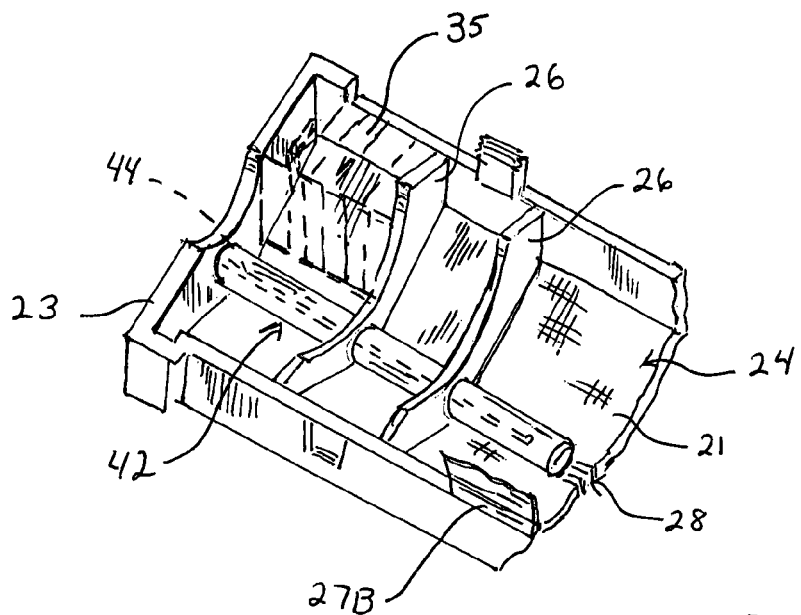
FIG. 8 is a partial perspective view illustrating a sanitation spray insert module.

The housing shells 24 and 25 are secured to one another by a pair of live hinges 27A and 27B and corresponding registration locking tabs 28A and 28B along the respective longitudinal edges 27 and 28 as seen in FIGS. 3, 7 and 8 of the drawings.

Each of the shell housings 24 and 25 have two complete display surfaces 21 and oppositely disposed portion of corresponding display surfaces 21.

Figure 4:
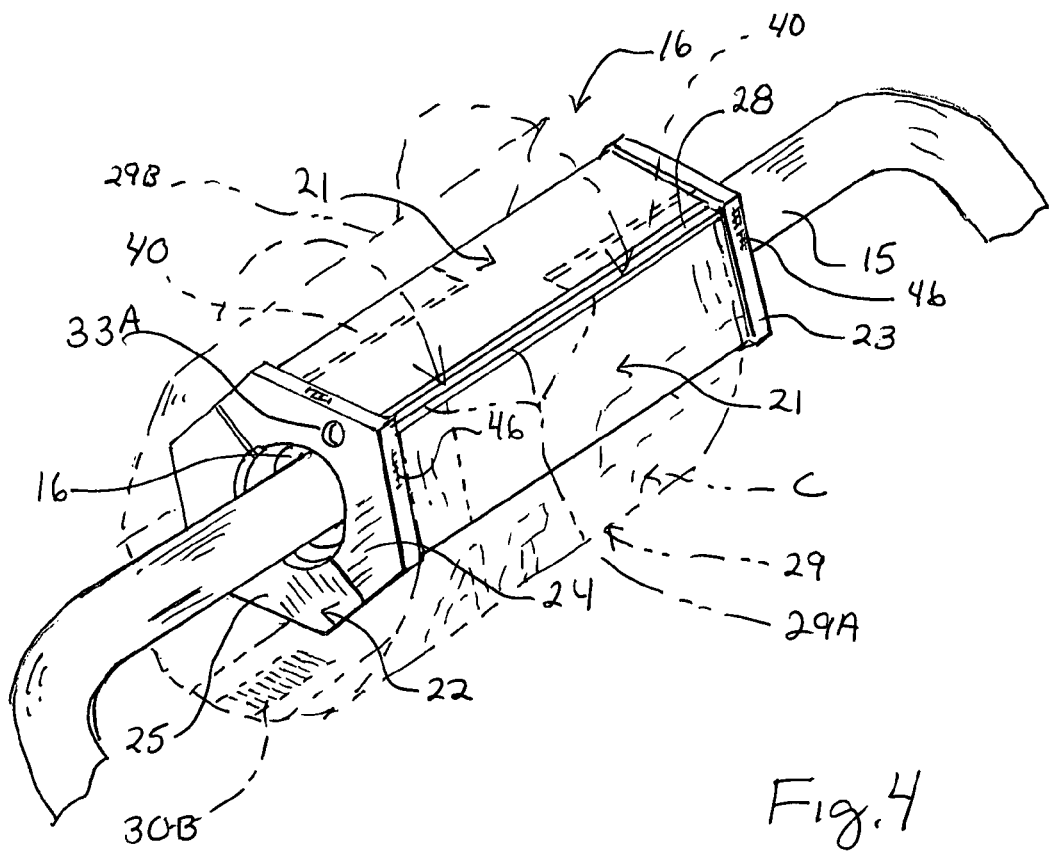
FIG. 4 is a perspective view of the dispensing device with an advertising display sheet positioned for attachment shown in broken lines thereon.
Figure 6:
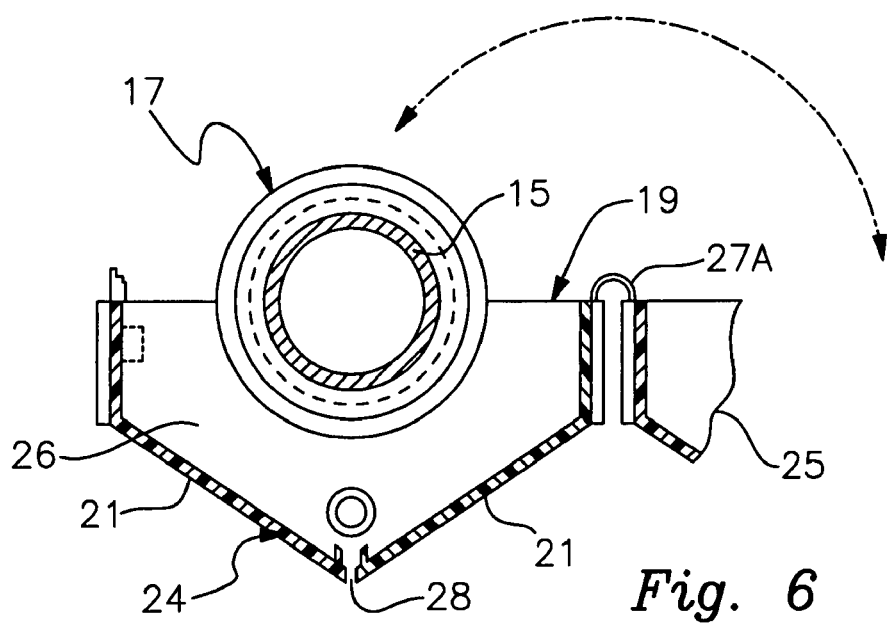
FIG. 6 is a partial sectional view thereof.

The housing shell 24 has an advertising retainment slot at 28 running the length thereof between the adjacent display surfaces 21, as seen in FIGS. 4, 6 and 7 of the drawings.

The slot enclosure 28 allows for the ends of a two-dimensional display cover sheet 29 of advertising copy material which is preferably printed on a transparent synthetic resin sheet for illumination purposes to be inserted therein.

The cover sheet 29 wraps around the exterior of the housing display surface 21 conforming thereto. The advertising copy material can include store or manufacture redemption coupons.

The advertising copy material including the store or manufacturer redemption coupons C and have associated pre-determined identification bar coding at 30. Such bar coding 30 would allow the store check-out person (not shown) to scan the bar code 30 appearing in association with the coupon C registering the savings to the customer automatically during check-out. Additionally, it will be noted that inventory control can be associated with the scan of the bar code so that a determination can be made as to the viability and effectiveness of the coupons and stimulating sales of preferred products.

A flapper access and retrieval assembly 31 for the display cover sheet 29 is positioned in the shell 24 inwardly at the end of the slot 28. The retaining assembly 31 comprises a rod 32 with a flapper tab 32A extending therefrom. Axial rotation is imparted by a spherical protrusion and registerable thread interengaging same when longitudinally activated via an access opening 33A in the end cap 22, best seen in FIG. 7 of the drawings. This allows for removal of the display cover sheet 29 from within the housing 16 of the invention when the respective ends of the display cover sheet 29 are inserted and secured there within by frictional retention.

Figure 5:
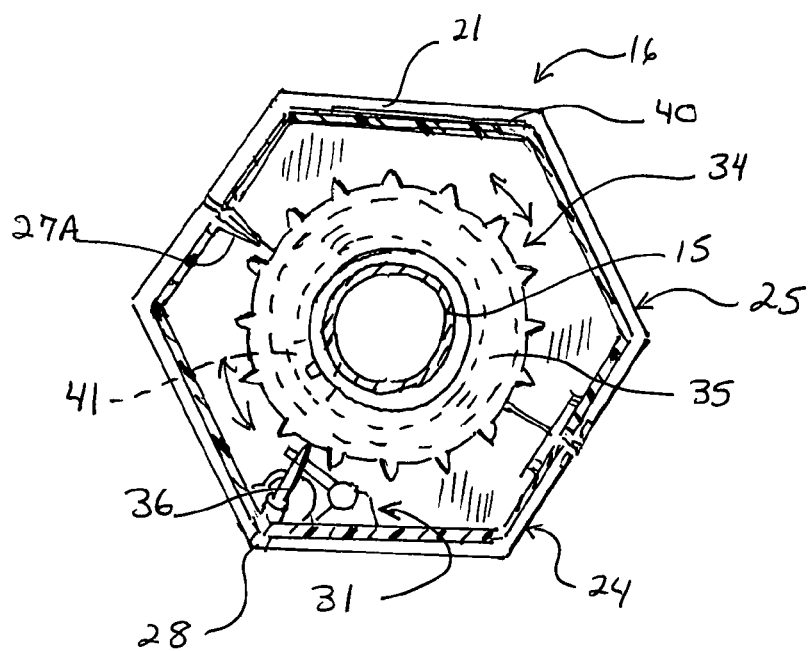
FIG. 5 is a sectional view on lines 5-5 of FIG. 2.

Referring now to FIGS. 3 and 5 of the drawings, an indexing assembly 34 is illustrated and shown as being secured to the cart handle 15 adjacent the support element hub 17 and end cap 22. The indexing assembly has an indexing gear 35 registerably engaged by a resilient engagement tab 36 extending from and securing to the interior surface of the shell 24 of the housing 20.

It will be evident from the above description that as the housing 20 with its multiple transparent display surfaces 21 is rotated the indexing tab 36 will selectively and resiliently engage the gear 35 providing specific index positioning and retainment of the housing 24 in that relation thereto so as to afford the display surfaces 21 effective and proportional selective positioning in relation to the handle 15 for selective viewing options as will be disclosed and discussed in greater detail hereinafter.

A plurality of illumination sources, such as LED's 37 are positioned on the central attachment and support hub area 38 of the attachment element 17 and in this example are electrically connected to an electrical power control circuit CC having rechargeable storage batteries 39 in communication therewith as best seen in FIG. 3 of the drawings.

A battery recharging element defined as solar panels 40 may be positioned around the respective display surfaces 21 providing a low level so-called trickle charge to the batteries 39 as noted. It will be evident that the display cover sheet 29 will be divided into areas corresponding to the display surfaces 21 of the housing 20 and that some areas will be more transparent than others for alignment with the hereinbefore positioned solar panels 40.

Power consumption of the LED's is regulated by multiple control features including motion activated switching 41 that will only be activated upon sensing cart motion and then only will illuminate a single display panel 21 at a time and only when a pre-determined user visual orientation is determined by select pre-determined geographical orientation criteria switching mechanism integrated into the indexing assembly 33.

A sanitation spray dispenser assembly 42 is positioned through the end cap 23 of the display attachment 16. The liquid dispenser assembly 42 has a replaceable reservoir tank with a dispenser spray pump 44 and outlet nozzle 45 by manually pumping the shopper (not shown) stored liquid L would be dispensed therefrom.

Referring now to FIG. 4 of the drawings, reflective tape strips 46 are applied around the perimeter of the respective end cap housings for visual reflective reference enhancing the effectiveness of the display attachment 16 of the invention. As noted, alternate information management systems may be incorporated into the display device of the invention in which coupon I.D. scanning via a bar code 30B can interface with the store's computer database, not shown, to provide a wide array of information by comparison database sorting including coupon identification and pricing, inventory, and as noted effectiveness of the specific display criteria and associated with the product identified by the coupon redemption or advertising indicia criteria as will be evident to those skilled in the art.

In operation, the end edge 29A of the display cover sheet 29 is inserted into the slot 28 frictionally engaged there within. The display cover sheet 29 is then pulled around the display surfaces 21 of the housing 20 and the opposite end edge 29B of the sheet is then inserted into the slot 28 and held correspondingly there within.

To retrieve the sheet 29 for replacement or removal, any available rod like structure, not shown, but indicated by arrow in FIG. 7 of the drawings is directed through an access opening 33A in the end cap 22 pushing the end of the flapper rod 32 longitudinally, as noted, thus rotating same and corresponding flapper tab 32A so as to engage and push the inserted end edges of the display sheet outwardly back through the slot 28 for removal as will be well understood by those skilled in the art.

Referring back to FIGS. 3 and 8 of the drawings, an optional GPS location device 35 can be seen positioned within the housing 20. This will provide tracking of the cart 10 on which the display attachment 16 is installed to determine a variety of data information source indicating positions.

It will also be seen that a scent dispenser 36 is combined with the hereinafter described indexing assembly 34 in which a scent insert of porice absorbing material is registerably engaged by rotation of the housing 20 via a scent element 37 as will be understood by those skilled in the art.

It will be evident from the above description that a new and novel information display attachment 16 for commercially available shopping carts, specifically grocery shopping carts has been illustrated and described and it will be apparent to those skilled in the art that various changes and modifications may be made thereto without departing from the spirit of the invention.

Therefore

We claim:

1. A display information attachment for shopping carts comprising,
   a multiple sided elongated display body member having an interlocking attachment element hub engageable on a handle portion of said shopping cart,
   rotatable bearing means on said attachment element hub,
   said display body member having multiple selective transparent display surfaces,
   illumination means for each of said display surfaces,
   an advertising indicia sheet associated with products removably positioned over said display surfaces, and
   means for selective indexing positioning of said respective display surface areas independent of one another and consistent with position orientation criteria, an illumination sequence thereof and attachment of removable means for said advertising indicia sheet.

2. The display information attachment for shopping carts set forth in claim 1 wherein said illumination means for selective illustration illumination of said display insert surfaces comprises,
   LED's on said handle portion attachment element hub and an electric control circuit in communication with said LED's and a source of power.

3. The display information attachment for shopping carts set forth in claim 1, wherein said indexing positioning of said respective display surface areas comprises,
   an indexing gear and engagement tab assembly and scent dispenser.

4. The display information attachment for shopping carts set forth in claim 1 wherein said indexing positioning of display surface sequence illumination thereof comprises,
   electrical activation of LED's by switch means on an indexing gear assembly.

5. The display attachment for shopping carts set forth in claim 1 wherein said advertising indicia comprises,
   I.D. identification bar code corresponding to product associated by said indicia.

6. The display attachment for a shopping cart set forth in claim 1 wherein said source of electrical power comprises,
   a battery, and solar panels on said display surface for recharging said battery.

7. The display attachment for a shopping cart set forth in claim 1 wherein said display attachment further comprises,
   a liquid dispenser within said display body member, said dispenser having a dispensing pump and nozzle outlet.

8. The display attachment for a shopping cart set forth in claim 1 further comprises, light reflecting tape strips removably secured on said elongated display body member in spaced relation to one another.

9. The display attachment for a shopping cart set forth in claim 1 wherein said attachment and removal means for said advertising indicia sheet comprises, a flapper tab assembly movably positioned from a first non-engagement position to a second engagement position with said advertising indicia sheet.

10. The display attachment for a shopping cart set forth in claim 1 further comprises a scent dispenser responsive to rotation of said display body.

11. The display attachment for a shopping cart set forth in claim 1 further comprises a GPS location module within for tracking analysis information position.

\* \* \* \* \*